Sept. 10, 1929.  W. J. CARROLL  1,728,041

BOTTLE OPENER

Filed Jan. 3, 1927

Inventor.
Walter J. Carroll.
By Frank McClintock,
Attorney.

Patented Sept. 10, 1929.

1,728,041

UNITED STATES PATENT OFFICE.

WALTER J. CARROLL, OF DETROIT, MICHIGAN.

BOTTLE OPENER.

Application filed January 3, 1927. Serial No. 158,787.

My invention relates to devices for removing the caps or covers of bottles, and the object of my improvements are first to provide a combination bottle opener adapted to remove the disk cover from milk bottles and also the caps generally used for sealing bottled beverages, and second provide means whereby the device can be securely attached to the wall or the under side of a convenient shelf.

I attain these objects by the mechanism shown in the accompanying drawing in which:—

Figures 1, 2:
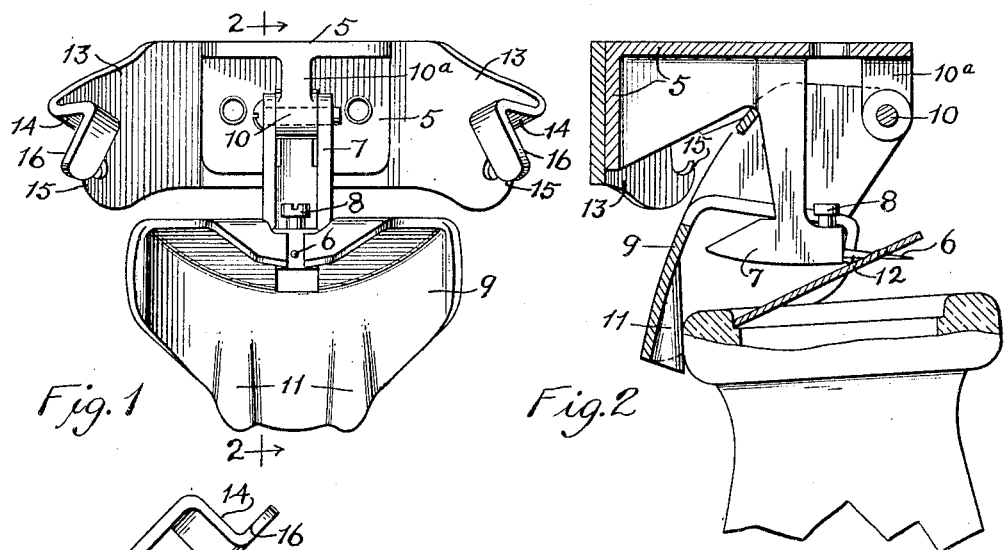
Figure 3:
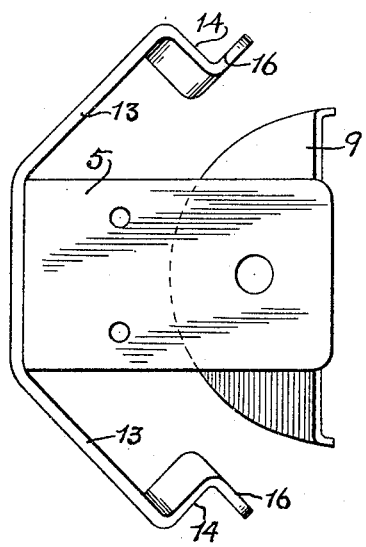
Figure 4:
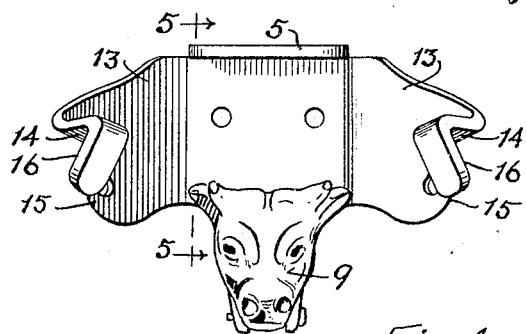
Figure 5:
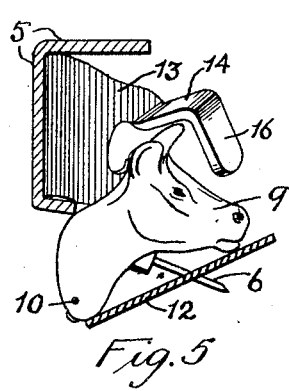
Figure 6:
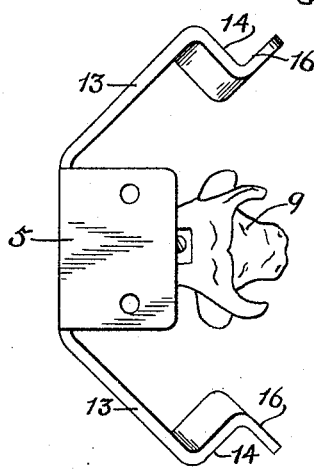

Figure 1 is a front view of the device with parts in normal position. Figure 2 is a longitudinal section view on line 2—2 of Figure 1 showing its operation in removing a cap from a milk bottle. Figure 3 is a top plan view of Figure 1. Figure 4 is a front view of an alternative construction of the device. Figure 5 is a sectional side view on the line 5—5 of Figure 4. Fig. 6 is a top plan view of Figure 4.

Similar reference characters refer to similar parts throughout the several views.

The milk bottle opener consists essentially of a sharp pointed pin 6 which is securely held in the lower part of the arm 7 which is slotted as shown in Figure 2 and provided with a clamping screw 8. A stripper shield 9 is pivotally connected at 10 to the bracket 10ª which supports the horizontal top member of the right angled base plate 5 by which the device may be secured to the under side of a shelf in Figures 1 and 2 or to the wall as shown in Figures 4 and 5.

The construction shown in Figures 1, 2 and 3 is especially designed for use in restaurants, hotels or other places where a considerable number of milk bottles are to be opened. The stripper shield 9 is provided for the purpose of forcing the paper cap from the pin 6 when the bottle is removed downward from its position shown in Figure 2. The neck of the milk bottle will engage the cam projections 11 until the bottle has been lowered a sufficient distance so that when the stripper shield is free to drop by gravity to its normal position the paper milk bottle cap 12 will be ejected from the pin 6 across the top of the bottle.

The construction shown in Figures 4, 5 and 6 is designed for household use where it is usually desired to replace the paper cover on the milk bottle. Instead of the stripper shield of Figures 1, 2 and 3, the lever shield 9' is pivoted at a point 10 near the lower end of the vertical member of the base plate 5. This lever shield is preferably shaped to represent a cow's head. When the paper cover has been removed from the milk bottle, it will be retained on the pin 6 as shown in Figure 5 until removed by the fingers.

The two projecting arms 13, one on each side of the centrally located milk bottle opener, terminate in devices for removing the caps generally used for sealing bottled beverages. In using these devices the top of the bottle is placed against the end guide 14 with the hook 15 engaging the lower edge of the cap, and on lifting the lower end of the bottle the cap will be easily and safely removed. The side guide 16 insures that the hook 15 will always engage the cap centrally and prevent the bottle top slipping to one side.

The operation of opening a milk bottle only requires the use of one hand by which the bottle is lifted up against pivoted shield 9 at such an angle as will cause the pin 6 to pierce the cap. The bottle is then pushed to substantially a vertical position causing the pin to pry the cap loose when the bottle can be lowered and taken away.

What I claim as my invention is:—

1. In a milk bottle opener the combination with a supporting base plate, of a sharp pin rigidly secured thereto and a pivoted stripper shield, actuated by gravity to eject the bottle cap from the pin when the bottle is removed.

2. The combination with a base plate, a sharp pin rigidly secured thereto, and a stripper shield pivotally connected to said base plate and having a portion adapted to be swung across said pin by the weight of the shield, whereby to eject a bottle cap held by said pin.

WALTER J. CARROLL.